Patented Apr. 22, 1947

2,419,230

UNITED STATES PATENT OFFICE 2,419,230

THERAPEUTIC COMPOSITIONS AND METHOD OF PREPARING SAME

Simon L. Ruskin, New York, N. Y., assignor to Frances R. Ruskin

No Drawing. Application September 7, 1942, Serial No. 457,598

10 Claims. (Cl. 260—239.6)

The present invention relates to cevitamic (laevo-ascorbic) acid derivatives of organic amino compounds, both acid addition products and salts and mixed addition products and salts, and particularly of sulfanilic acid and of sulfanilamides, including sulfanilamide itself and its N' derivatives, and also those derivatives wherein one or both of the hydrogens of the nuclearly bound amino group are replaced by an acyl or other group, including derivatives wherein the sulfonamido group is substituted by an alkylol group, the hydroxy group being free for reaction with the cevitamic acid to form an ester.

The present application is a continuation-in-part of my pending application, Serial No. 192,789, filed February 26, 1938, which issued as Patent No. 2,294,937, on September 8, 1942.

It is a general object of the invention to improve the physiological and/or physical properties of organic amino compounds having therapeutic activity and having a basic group, such as $NH_2$ or alcoholic hydroxyl, by combining the same with cevitamic acid to form either a true salt or an addition compound, to effect a reduction in the toxicity, an improvement in the solubility, a diminishing of irritation on injection, etc.

The toxicity of sulfanilamide and its derivatives, including sulfanilamide itself, its N'-acyl derivatives, sulfapyridine, sulfadiazole, sulfathiodiazole, sulfadiazine, etc. is well known; in fact, many of the known derivatives have been produced in the attempt to reduce the toxicity of the parent sulfanilamide. It also has been found that where the treatment of, for example, open wounds required both a sulfanilamide drug and an alkaloid anaesthetic, such as novocaine, the latter acts antagonistically toward the bactericide, thereby considerably reducing its effectiveness.

I have found that by combining various therapeutic agents containing an amino group with cevitamic or ascorbic acid, either to form an ester (as by reaction with an alcohol group) or an addition compound, or both, products of improved properties are obtained. These improvements consist generally in a reduced toxicity, an increased solubility, the elimination or reduction of irritating action on the tissues, and in the case of anaesthetics, like novocaine, the suppression of the antagonism toward sulfanilamide drugs. My improved compounds are of particular value because they have associated or chemically incorporated therein a substance, namely, cevitamic acid, which is a normal component of the blood and of body tissues, so that the modification of the known therapeutic agents does not involve the introduction of still another radical foreign to the animal organism. The combination of the normally toxic sulfanilamides with cevitamic acid either in the form of acid addition products, or of esters by reaction with an alcohol hydroxyl group introduced into the sulfanilamide compound, as by substitution of N' with an alkylol group, or in both ways, thus involves a modification of the therapeutic agent which makes it more easily tolerated by the animal body.

The detoxicating action of cevitamic acid on the sulfanilamides is probably the result of the formation of a larger molecule with pronounced serum protein-combining power. This combining power with the serum protein permits a greater rate and degree of absorption of the therapeutic agent. Pick and his co-workers have shown that the toxicity of a substance introduced into the blood stream is inversely proportional to its ability to form serum protein complexes, and substances that do not form the serum protein complexes are toxic and are usually excreted in the uncombined form. This is one of the underlying difficulties with sulfonamide compounds, and in the process of excretion, they cause considerable kidney damage. The cevitamate (ascorbate) radical both increases the utilization of the sulfonamide compound and acts as a protective mechanism in its excretion.

The following examples illustrate several methods of manufacturing the improved compounds in accordance with the invention:

Example 1

*Preparation of acetylsulfanilyl cevitamic acid*

7 g. ($4/100$ mol) cevitamic acid were dissolved under cooling with ice in 25 cc. dry pyridine. The solution was then treated slowly under stirring and cooling with 10 g. ($4/100$ mol) of acetylamino benzene sulfochloride, care being taken to keep the reaction temperature at about 50° C. The reaction mixture was then placed on ice over night. The following day it was treated with excess ether. A heavy oil precipitated which turned to an amorphous semi-solid on being further washed with ether. The last traces of pyridine were removed in a vacuum desiccator at room temperature. The product showed no tendency to crystallize. It was soluble in water and alcohol, and insoluble in chloroform, acetone, benzene and ethyl acetate. The product was taken up in 50 cc. absolute ether and treated under stirring with 2 equivalents of sodium ethoxide in 100 cc. absolute alcohol. The second equivalent of sodium ethoxide was added because of the pyridine hydrochloride present. An orange colored precipitate was obtained which became filterable on standing in the ice chest over night. Yield of sodium salt: 11 g.

EXAMPLE 2

Preparation of sulfanilamide cevitamate 17.2 g. (1/10 mol) sulfanilamide and 17.6 g. (1/10 mol) cevitamic acid were well mixed and then 75 cc. dry methyl alcohol were added. On heating to the boiling point complete solution took place with the formation of a deep yellow color. The warm solution was then treated under stirring with 150 cc. chloroform. A crystalline precipitate formed which was filtered off after standing in the ice chest over night. Yield 33 g. or 95% theory.

To determine the amount of a cevitamic acid present the salt was titrated with 0.1N iodine solution.

Mg. cevitamic acid in 200 mg. salt: 105 mg. cevitamic acid found, 101 mg. cevitamic acid theory.

EXAMPLE 3

Preparation of sulfanil-ethanolamide mono-ascorbate 47 g. (1/5 mol) acetyl sulfanil chloride were slowly added under stirring to 24.5 g. (2/5 mol) ethanolamine dissolved in 100 cc. water, care being taken to keep the reaction temperature around 40° C. At the end of the reaction a thick paste was obtained which was allowed to stand on ice a few hours, and then filtered. Yield 51 g. or 98%. The crude product was dissolved in a mixture of 25 cc. water and 50 cc. 5N sulfuric acid, and the resulting solution was then heated on a water bath for three hours. The darkened acid solution was then neutralized to a pH of about 10 with 30% sodium hydroxide and allowed to stand on ice over night. At this point a heavy oil was obtained which crystallized on standing in the ice chest over night. The following day the resulting sulfanil-ethanolamide was filtered off and washed with a little cold water. It was purified by recrystallizing twice from 10 cc. boiling water to which animal charcoal had been added. At the end of the second purification the product precipitated as crystals. Yield 17 g. or about 40% of theory.

Analysis: N=12.61% found, 12.96% theory.

The reactions may be represented as follows:

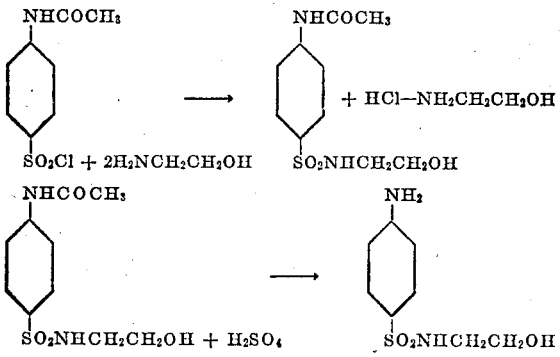

2.2 g. (1/100 mol) sulfanil-ethanolamide and 1.8 g. (1/100 mol) ascorbic acid were dissolved in 5 cc. dry methyl alcohol and boiled on a water bath until crystals began to show in the hot solution. The reaction mixture was then treated with 35 cc. chloroform and allowed to stand on ice over night. The following day pale yellow crystals of the mono-ascorbate were filtered off and washed with chloroform. Yield 3.8 g. or 95% theory.

To determine the amount of ascorbic acid present the salt was titrated with 0.1N iodine solution.

Mg. ascorbic acid in 200 mg. salt: 92.4 mg. found, 89.0 mg. theory.

EXAMPLE 4

Preparation of sulfanil-ethanolamide di-ascorbate 2.2 g. (1/100 mol) sulfanil-ethanolamide and 3.6 g. (2/100 mol) ascorbic acid were dissolved in 10 cc. dry methyl alcohol and boiled (with cover) on a water bath until crystals began to show in the hot solution. The reaction solution was then treated with 50 cc. chloroform and allowed to stand on ice over night. The following day dark yellow crystals of the di-ascorbate were filtered off and washed with chloroform. Yield 5.2 g. or 90% theory.

To determine the amount of ascorbic acid present, the salt ester was titrated with 0.1N iodine solution.

Mg. ascorbic acid in 200 mg. salt: 127.6 mg. found, 124.4 mg. theory.

The above product was also prepared in the following manner:

21.6 g. (1/10 mol) sulfanilyl ethanolamide were dissolved in about 250 cc. absolute methyl alcohol. To this solution were added 35.2 g. (2/10 mol) of ascorbic acid and the solution concentrated until a greenish yellow color was obtained. It was then treated with three volumes of chloroform and allowed to stand on ice over night. The following day the precipitate was filtered off and washed with a little chloroform. Yield 56 g. or practically quantitative. Titration with iodine showed the formation of a double ascorbate.

EXAMPLE 5

Preparation of strychnine ascorbate 33.4 g. strychnine and 17.6 g. (1/10 mol) ascorbic acid were warmed with 250 cc. absolute methyl alcohol, and the resulting solution concentrated to about 150 cc. It was then treated with about 1000 cc. acetone which were slowly added under stirring and cooling. An amorphous precipitate was obtained which hardened on standing in the ice chest over night. Yield 41 g. or nearly 100%. The product is light yellow and soluble in its own weight of water.

EXAMPLE 6

Novocaine ascorbate 23.6 g. (1/10 mol) novocaine and 17.6 g. (1/10 mol) ascorbic acid were warmed with about 200 cc. absolute methyl alcohol until solution was complete. The resulting solution was then slowly treated under stirring and cooling with 500 cc. chloroform or acetone. A yellow precipitate was obtained, which hardened on standing over night in the ice chest. Yield 40 g. or almost quantitative. The cevitamates of cocaine and atropine may be similarly prepared.

In certain of the above reactions, as in the reaction between sulfanilamide and ascorbic acid, a small proportion of zinc chloride may be employed as catalyst in the salt or ester formation.

That some sort of chemical combination takes place between the amino compounds above described and cevitamic acid is evident, for example, from the fact that in the case of sulfanilamide cevitamate, greater solubility in methyl alcohol is obtained than is possessed either by sulfanilamide or by cevitamic acid. As this product is the salt of a relatively weak acid and relatively weak base, it hydrolyzes to a large extent in water; nevertheless, the cevitamate appears to be less toxic in wound serum than sulfanilamide alone. In the form of the cevitamate, or in the presence of a substantially equivalent amount of cevitamic acid, the solubility of sulfanilamide in water is increased from about 0.8% to about 1.2%. This increase in solubility with simultaneous reduction in toxicity greatly enhances the therapeutic value of the sulfanilamide.

While in certain of the above examples I have described the use of $N^4$ acetyl derivatives, such acetylated compound was presented only by way of example; for other acyl groups may be substituted in the para-amino group, such as propionyl, valeryl, benzoyl, and the like. Where it is desired to form the ester of a sulfonalkylolamide compound with cevitamic acid while keeping the para-amino group unsubstituted, the corresponding para-nitro compound may be used as starting material and the para-nitro-benzenesulfonalkylolamide cevitamate then converted to the corresponding para-amino compound by careful reduction, as by means of activated hydrogen in the manner well understood in the art.

In place of the ethanolamine, other alkylolamines may be used, such as propanolamine, butanolamine, as well as their isomers and the higher alkylolamines.

Heterocyclic compounds having a reactive amino group are also suitable for the production of valuable therapeutic compounds. For instance, one may employ the 2.6 diamino 2-ethyl pyridine, which possesses anaesthetic properties, and bring the same into reactive contact with cevitamic acid to cause the formation of an amino-ethyl-pyridine-amino-cevitamate having considerably improved properties. Other compounds of analogous character and having the pyridine or quinoline nucleus may be employed in this reaction.

Many di-azo compounds are known which have found application as valuable anti-bacterial agents and have aryl as well as heterocyclic groups may be combined in accordance with the present invention. As typical of such compounds one may take the 3.6 diamino 2-methyl 5-phenylazo pyridine and combine the same with cevitamic acid as above explained. Other compounds of the azo type having two heterocyclic radicals are also applicable to the present invention; for example, the 2.6 diamine 3-pyridylazo pyridine may be coupled wtih the cevitamic acid to give bactericidal compounds of improved value. Also available are similar compounds having substituent groups in place of one or more of the free hydrogens on the rings, such as halogen, hydroxy, alkoxy, alkyl, aryl, and the like.

From the above it will be seen that a very large variety of therapeutic compounds of diverse characters are suitable for combination with cevitamic acid, forming compounds of enhanced value. While the character of the compounds may vary widely, it is essential that there be present an amino group capable of combining with an acid group under the conditions stated above or under other conditions well known to the skilled chemist; or else, an alkylol group having a free hydroxyl capable of reacting with cevitamic acid.

The dosage of my improved compounds can be made the same as the corresponding known compounds; however, because of generally improved therapeutic ratio, somewhat lower dosages may be relied on. My improved products can be administered orally or parenterally, or applied to open wounds, just like the corresponding known compounds.

Although I have described my invention by setting forth several specific embodiments thereof, it is not limited to the details set forth above. I am not to be limited to the specific compounds described, as other compounds of analogous character may be formed wherein the reactive amino group is attached to organic radicals of alkyl, aryl, aralkyl, heterocyclic and mixed types.

I claim:

1. Method of preparing sulfanilyl-ethanolamide ascorbate which comprises heating sulfanilyl-ethanolamide with ascorbic acid in dry methyl alcohol, adding thereto an organic solvent miscible with the alcohol but in which the ascorbate is relatively insoluble and thereafter separating the precipitated ascorbate.

2. Method according to claim 1, wherein the added organic solvent is chloroform.

3. A therapeutic preparation comprising a compound of ascorbic acid and a sulfanilalkylolamide.

4. A therapeutic preparation comprising a compound of ascorbic acid and a sulfanilethanolamide.

5. The product obtained by the reaction of a member of the group consisting of sulfanil-$N^1$-alkylolamides and the $N^4$-acyl derivatives thereof with ascorbic acid.

6. The product obtained by the reaction of a member of the group consisting of sulfanil-$N^1$-ethanolamide and the $N^4$-acyl derivatives thereof with ascorbic acid.

7. The product obtained by the reaction of a sulfanil-$N^1$-alkylolamide and ascorbic acid, the acid radical being combined with the hydroxyl of the alkylol group.

8. The product obtained by the reaction of sulfanil-ethanolamide and ascorbic acid, the acid radical being combined with the hydroxyl of the ethanol group.

9. The product obtained by the reaction of a sulfanil-$N^1$-alkylolamide with ascorbic acid in an amount sufficient to react with the hydroxyl of the alkylol group and to add a molecule of ascorbic acid at the para-amino group.

10. The product obtained by the reaction of sulfanil-$N^1$-ethanolamide with ascorbic acid in an amount sufficient to react with the hydroxyl of the ethanol group and to add a molecule of ascorbic acid at the para-amino group.

SIMON L. RUSKIN.

REFERENCES CITED

The following references are of record in the file of this patent:

UNITED STATES PATENTS

| Number | Name | Date |
|---|---|---|
| 2,212,831 | Hoffmann | Aug. 27, 1940 |
| 2,275,809 | Roberts | Mar. 10, 1942 |
| 2,249,903 | Lautenschlager | July 22, 1941 |
| 2,140,989 | Eisenbrand | Dec. 20, 1938 |
| 2,132,662 | Volwiler | Oct. 11, 1938 |
| 2,134,246 | Elger | Oct. 25, 1938 |
| 2,150,140 | Warnat | Mar. 7, 1939 |
| 2,260,870 | Ruskin | Oct. 28, 1941 |
| 2,294,937 | Ruskin | Sept. 8, 1942 |
| 2,283,817 | Martin | May 19, 1942 |

OTHER REFERENCES

Science, volume 86, pages 228, 229 (1937), cited in Chemical Abstracts 1937, page 8029.